United States Patent [19]
Johnson et al.

[11] Patent Number: 5,873,168
[45] Date of Patent: Feb. 23, 1999

[54] SHEAR KNIFE WITH BLADE INSERT

[76] Inventors: Dennis Neal Johnson, 31526 39th Ave. SW., Federal Way, Wash. 98023; David J. Markham, 921 S. Fifth Ave., Tumwater, Wash. 98512

[21] Appl. No.: 804,933

[22] Filed: Feb. 24, 1997

[51] Int. Cl.$^6$ .................................................. B23P 19/00
[52] U.S. Cl. ..................................... 30/134; 241/101.73
[58] Field of Search .................... 30/134, 349; 76/104.1, 76/106.5; 241/101.73

[56] References Cited

U.S. PATENT DOCUMENTS

| | | | |
|---|---|---|---|
| 4,193,189 | 3/1980 | Marin | 30/349 X |
| 4,558,515 | 12/1985 | LaBounty | 30/134 |
| 4,686,767 | 8/1987 | Ramun et al. | 30/134 |
| 4,771,540 | 9/1988 | LaBounty | 30/134 |
| 4,776,093 | 10/1988 | Gross | 30/134 |
| 4,897,921 | 2/1990 | Ramun | 30/134 |
| 5,187,868 | 2/1993 | Hall | 30/134 |
| 5,197,193 | 3/1993 | Smith | 30/134 |
| 5,230,151 | 7/1993 | Kunzman et al. | 30/134 |

OTHER PUBLICATIONS

Brochure: "Veratech Attachments, Mechanical Power–Shear–VPS With Stick Relieving Device", Veratech Attachments, 61 County Line Road, Somerville NJ 08876.

*Primary Examiner*—Douglas D. Watts
*Attorney, Agent, or Firm*—Joan H. Pauly

[57] ABSTRACT

A two-piece shear knife replaces a conventional one-piece shear knife for use in a power shear. The two-piece knife includes a main body with a cutout formed by first and second inner surfaces. A blade insert with a single cutting edge is seated in the cutout. One of the inner surfaces of the cutout and the complementary abutting insert surface are angled toward a confronting surface to direct shearing forces from the cutting edge diagonally inwardly toward the inner corner of the cutout and into the main body. This efficiently transfers shearing forces and reinforces seating engagement of the insert. The two-piece construction of the shear knife allows the main body to be made from a less expensive, less wear resistant material.

8 Claims, 2 Drawing Sheets

U.S. Patent    Feb. 23, 1999    Sheet 1 of 2    5,873,168
FIG. 1
PRIOR ART
FIG. 1A
PRIOR ART
FIG. 2
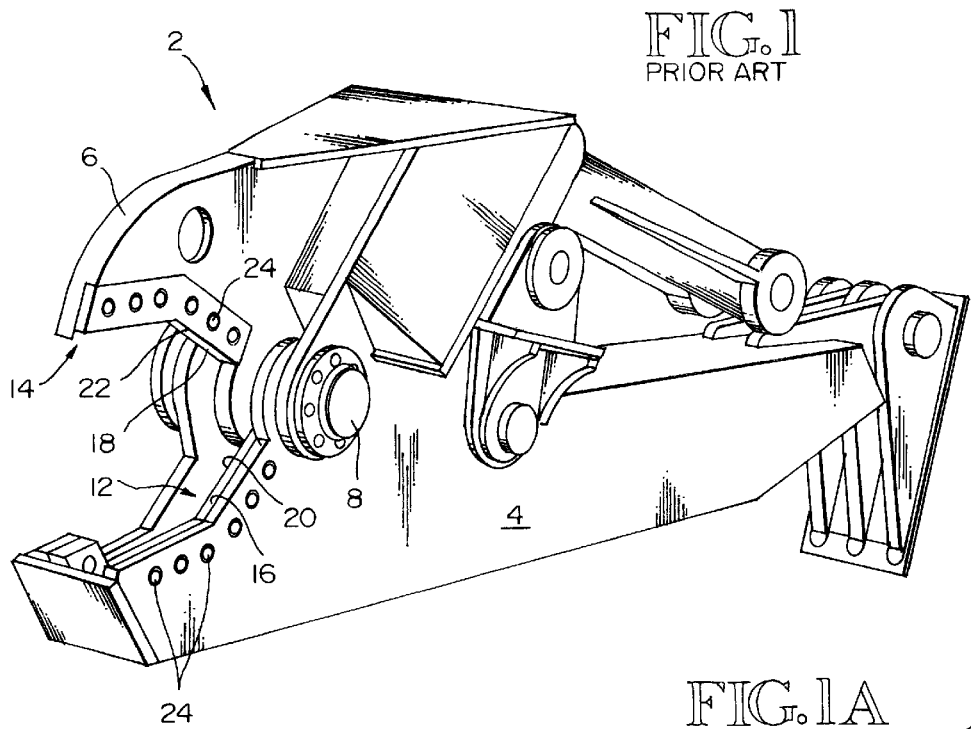
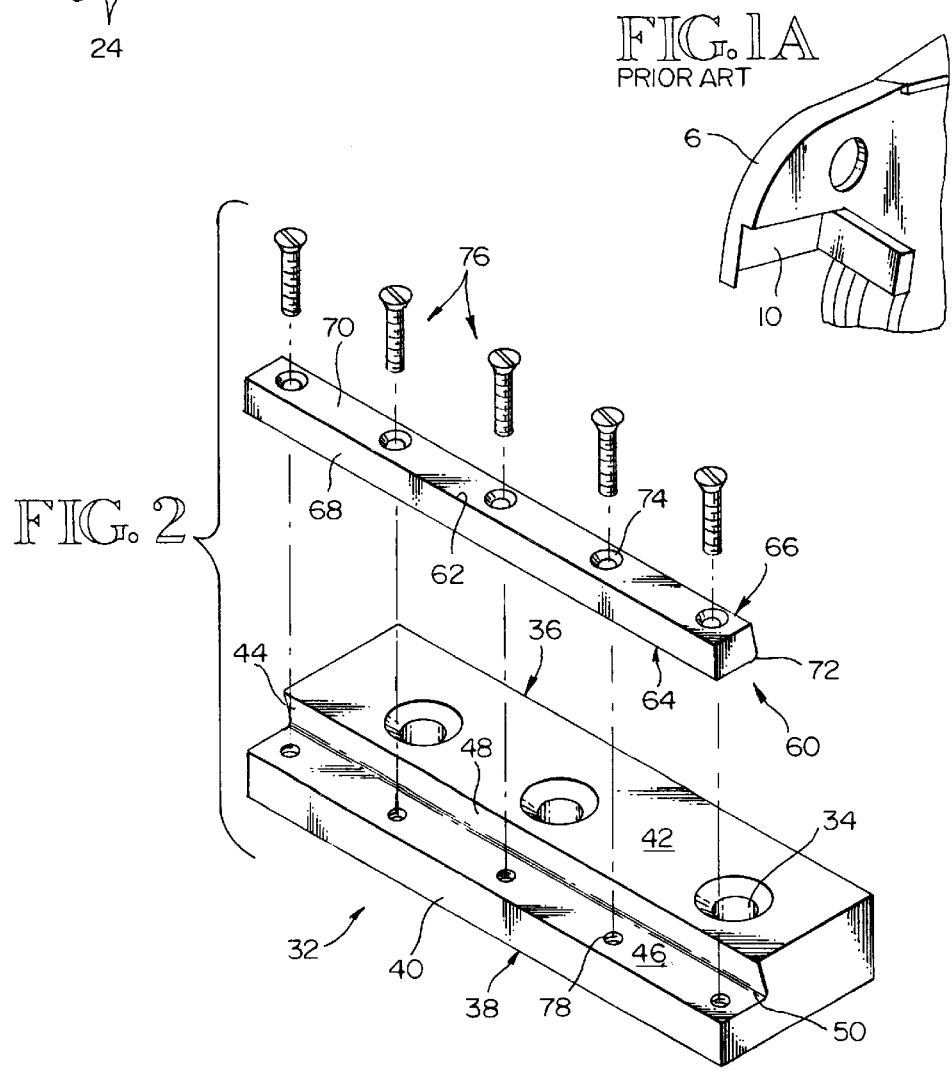

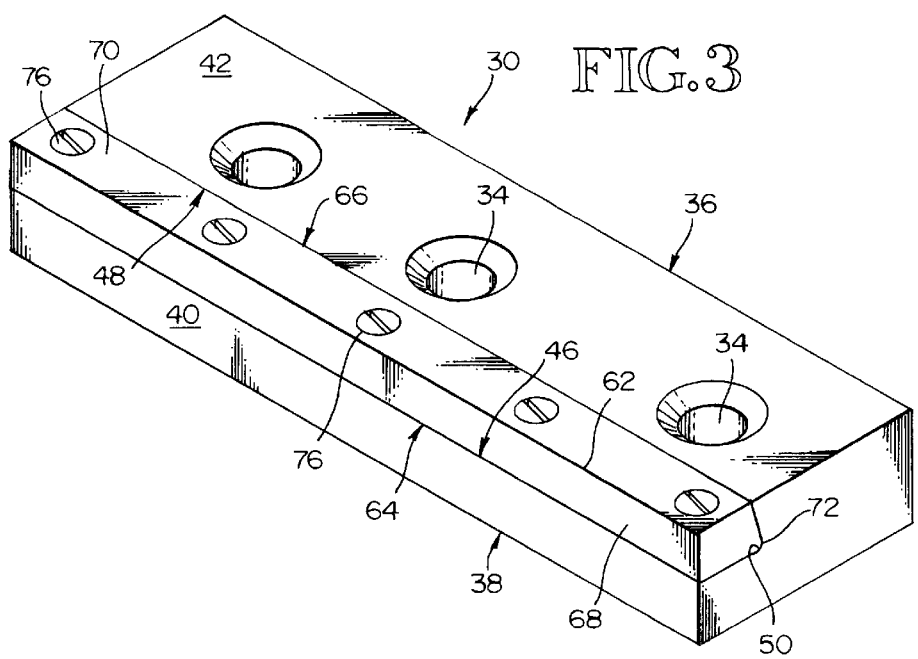
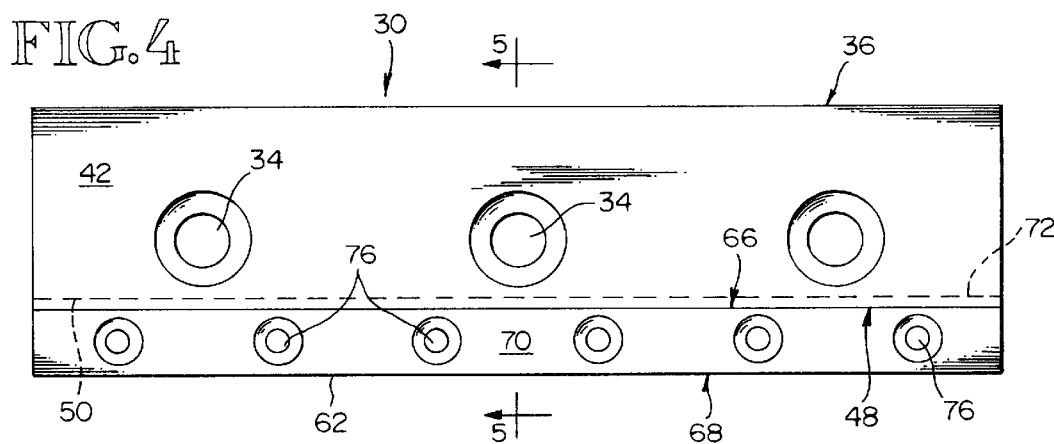
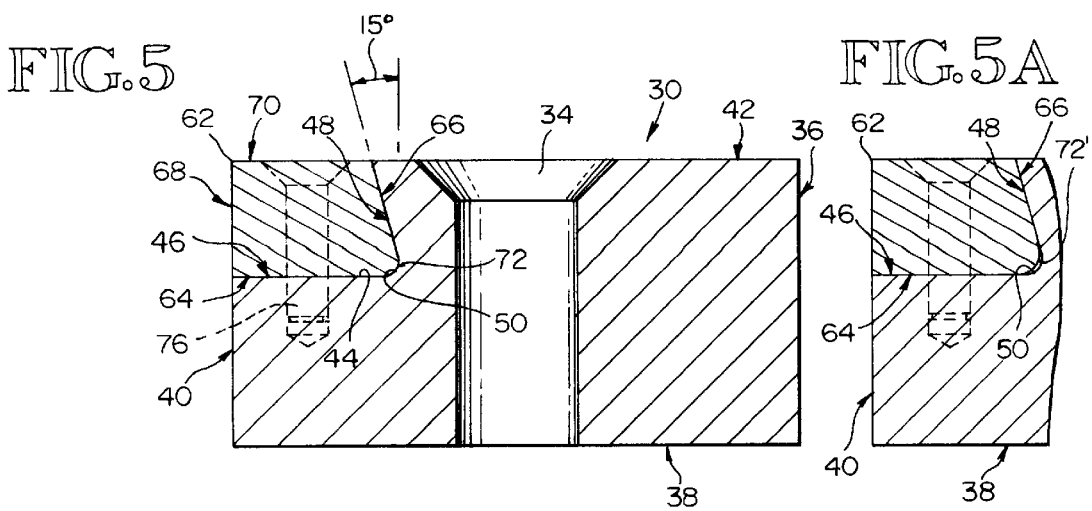

SHEAR KNIFE WITH BLADE INSERT

TECHNICAL FIELD

This invention relates to a shear knife for a power shear and, more particularly, to a shear knife that replaces a conventional shear knife having a plurality of cutting edges and that has a main body receivable into a knife seat and a blade insert with a single cutting edge. The insert is removably mounted in a cutout in the body and is made from a material more wear resistant than the body.

BACKGROUND INFORMATION

Power shears have been used for a number of years for various heavy duty cutting and shearing tasks. For example, they are used in demolition work to reduce materials, such as concrete and steel, to smaller size chunks suitable for removal from a demolition site. In conventional power shears, each of two opposing jaws has a shear knife removably positioned in a knife seat. Typically, a shear knife has a substantially rectangular configuration with at least two, usually four, cutting edges. It is made of an extremely hard, wear resistant material so that each of the four cutting edges may be sharpened to provide shearing action in cooperation with a cutting edge of a shear knife on an opposing jaw. When a cutting edge wears out, the shear knife may be removed from its knife seat, reoriented, and replaced in the knife seat with a different edge serving as the cutting edge. When all four cutting edges are worn, the shear knife typically must be taken to another location for repair. The repair involves welding on and regrinding each of the cutting edges. To avoid delays in the demolition work, the shear knife that has been removed from the demolition site must be replaced with a new shear knife.

In order to provide four cutting edges, the entire body of the shear knife must be made from an extremely hard, wear resistant material. Once a shear knife can no longer be repaired, the high cost of the material from which it is made adds considerably to the expense of replacing the entire shear knife. The high cost and time consuming nature of the repair operation further adds to the expense of the conventional shear knife.

FIG. 1 illustrates a common type of known power shear 2. The shear 2 has a stationary jaw 4 and a pivotable jaw 6 pivotably connected to the stationary jaw 4 at a pivot connection 8. The shear 2 is mountable on a piece of heavy equipment, such as a backhoe. The hydraulic system of the backhoe may be used to power the shear 2. Each jaw 4, 6 carries one or more shear knives. An L-shaped knife seat 10 (FIG. 1A) is provided for receiving each shear knife. Referring to FIG. 1, the stationary jaw 4 has a knife seat that receives a shear knife 12, and the pivotable jaw 6 has a knife seat that receives an opposing shear knife 14. The two shear knives 12, 14 have confronting surfaces 16, 18, respectively, that face or confront each other. The exposed outer edges 20, 22 of the confronting surfaces 16, 18 form cutting edges. Each shear knife 12, 14 is removably secured in its knife seat by a plurality of fasteners 24. When the pivotable jaw 6 is pivoted relative to the stationary jaw 4, the structural elements being demolished are gripped between the two jaws 4, 6 by the confronting surfaces 16, 18. The pivotable jaw 6 is received down into a slot formed by the stationary jaw 4 to shear the structure gripped by the jaws 4, 6. The shearing action is provided by the shear knives 12, 14, and specifically by their cutting edges 20, 22, as the pivotable cutting edge 22 moves toward and past the stationary cutting edge 20 and into the recess.

The cost of the conventional plural-cutting-edge shear knife is further increased by the need to replace the entire shear knife in order to provide a cutting edge of a different material. In demolition work, various types of materials are broken up. For example, both concrete and steel may need to be sheared during the demolition of a building having reinforced concrete structures. A cutting edge material suitable for use in shearing steel is generally not suitable for concrete. Thus, the entire shear knife must be replaced for optimal efficiency in shearing the different materials. The additional expense that this entails adds to the cost of the demolition operation. Moreover, the choice of materials may be limited by a lack of compatibility of some cutting materials with the material of the power shear knife seat.

SUMMARY OF THE INVENTION

The present invention provides an improved shear knife for use in a power shear of a type mountable on a piece of heavy equipment, such as a backhoe, and having a pair of opposite jaws. At least one of the jaws is mounted to pivot relative to the other, between an open position and a closed position. Each jaw includes a knife seat configured to receive a shear knife, to position the shear knives to have confronting surfaces and to cooperate with each other to shear material when the jaws are moved toward their closed position.

According to an aspect of the invention, the improved shear knife comprises a main body and a blade insert. The main body is configured to seat in a corresponding one of the knife seats of a power shear and to removably secured therein. The body is made of a first material that is sufficiently hard to carry forces generated by shearing action of the jaws. The body has a corner cutout running along a longitudinal edge thereof. The cutout is defined by first and second inner surfaces. The first inner surface intersects and is at least substantially perpendicular to the confronting surface. The second inner surface meets the first inner surface at an inner corner of the cutout and forms an acute angle therewith to angle the second inner surface toward the confronting surface. The blade insert has a single longitudinal cutting edge. It is configured to be received into the cutout in the main body with surface portions of the insert abutting the first and second inner surfaces and with the cutting edge diagonally opposite the inner corner to confront a corresponding cutting edge on an opposite jaw. The insert is made from a second material more wear resistant than the first material from which the body is made and sufficiently hard to carry shearing forces. The shear knife also includes a fastener engaging the insert and the body to removably secure the insert in the cutout. The body and the insert together form the confronting surface. In use, the angling of the second inner surface tends to direct shearing forces from the cutting edge diagonally inwardly toward the inner corner and into the main body to efficiently transfer forces to the main body and reinforce seating engagement of the insert in the cutout.

The shape of the inner corner of the cutout and the corresponding corner edge of the insert may be varied. Preferably, both of these elements are radiused. This facilitates machining of the elements and transfer of forces from the insert to the body. In order to avoid stress concentration at the meeting of the corner edge of the insert and the inner corner of the cutout, the shear knife may be provided with a clearance between the insert and the body at the inner corner. This may be provided instead of, or in addition to, the radiused corner.

The angle at which the first and second inner surfaces meet may also be varied. In the currently preferred embodiment, the angle is about 75°.

The choice of the first and second materials depends largely on the type of shearing task in which the shear knife is to be used. In addition to the requirement that the first material be sufficiently hard to carry the shearing forces, the first material must be compatible with the material of the knife seat. The second material must meet appropriate hardness and wear resistance requirements and be compatible with the first material. However, there is no need for the second material to be compatible with the knife seat material. This increases the versatility of the shear knife, in comparison with conventional shear knives, in terms of the types of cutting edge material that may be used. Examples of suitable materials are first and second materials both of which comprise steel, or a first material that comprises an alloy steel and a second material that comprises carbide or ceramic. Other wear resistant materials suitable for use as the second material include plastic.

A main advantage of shear knives constructed in accordance with the invention is that they reduce the cost of initially acquiring, repairing, and replacing the shear knife. The cost saving of acquisition and replacement is achieved by the lower cost of the less wear resistant main body portion in comparison to the relatively expensive material of the insert. Repair cost is also considerably reduced. There is never a need to remove the entire shear knife from a work site in order to repair it. All that is required when the cutting edge wears out is to simply remove the insert and replace it with a new insert. Since the insert is a relatively small portion of the entire shear knife, the cost of replacing it is relatively low.

The angled inner surface of the main body cutout functions to direct shearing forces into the inner corner of the cutout and also to help retain the insert in place in the cutout. The latter function makes it possible to use a smaller size fastener than would otherwise be required. Since the insert is removably secured in the cutout, it may easily be replaced at a work site. A plurality of inserts may be kept on hand at the work site to handle a variety of cutting requirements. The cost of maintaining an inventory of various inserts is considerably less than is encountered in connection with the use of conventional shear knives, which require the availability of an entire shear knife for each situation requiring a cutting edge of a different material.

BRIEF DESCRIPTION OF THE DRAWINGS

In the drawings, like element designations refer to like parts throughout, and:

FIG. 1 is a pictorial view of a known type of power shear.

FIG. 1A is a fragmentary pictorial view of the pivotable jaw of the power shear shown in FIG. 1, with the shear knife removed to illustrate the knife seat.

FIG. 2 is an exploded pictorial view of the preferred embodiment of the shear knife of the invention.

FIG. 3 is like FIG. 2 except that it shows the shear knife in an assembled condition.

FIG. 4 is an elevational view of the shear knife shown in FIG. 3.

FIG. 5 is a sectional view taken along the line 5—5 in FIG. 4.

FIG. 5A is a fragmentary sectional view like the left hand portion of FIG. 5 but showing a modification of the preferred embodiment.

BEST MODE FOR CARRYING OUT THE INVENTION

The drawings show a shear knife 30 that is constructed according to the invention and that constitutes the best mode for carrying out the invention currently known to the applicants. FIG. 1 illustrates one example of a type of power shear 2 in which the shear knife of the invention may be used. It is intended to be understood that the shear knife of the invention may also be used to advantage in other types of power shears.

Referring to FIGS. 2–5 and especially FIG. 2, the shear knife 30 includes a main body 32 and a blade insert 60. The body 32 has a plurality of fastener openings 34 for receiving fasteners 24 to secure the body 32 into the knife seat of a power shear jaw. When the body 32 is received into a knife seat, seating surfaces 36, 38 are received into abutting engagement with the perpendicular inner surfaces of the L-shaped seat. The abutting engagement of the perpendicular seating surfaces 36, 38 is the same type of engagement that a conventional shear knife makes with a knife seat of a power shear jaw.

The body 32 also includes a confronting surface 40 and an outer surface 42 that is perpendicular to the confronting surface 40. When the body 32 is seated, both of the surfaces 40, 42 remain exposed. The fastener openings 34 extend through the perpendicular outer surface 42 to enable the body 32 to be removably secured in the seat in the same manner as a conventional shear knife. Portions of the confronting and perpendicular outer surfaces 40, 42 are removed by a corner cutout 44 that runs along a longitudinal edge of the body 32. The cutout 44 is defined by first and second inner surfaces 46, 48, respectively. The first inner surface 46 intersects and is at least substantially perpendicular to the confronting surface 40. Preferably, the first inner surface 46 is perpendicular to the confronting surface within the tolerance limits of the manufacture of the body 32. The second inner surface 48 meets the first inner surface 46 at an inner corner 50 and forms an acute angle therewith. This angles the second inner surface 48 from the inner corner toward the confronting surface 40. The size of the acute angle between the first and second inner surfaces 46, 48 may be varied. The currently preferred angle is an angle of 75°. This is illustrated by the angle of 15°, shown in FIG. 5, by which the two inner surfaces deviate from a perpendicular relationship.

The blade insert 60 has a trapezoidal configuration complementary to the cutout 44 in the body 32. A longitudinally extending edge of the insert 60 forms a cutting edge 62. Intersecting seating surfaces 64, 66 of the insert 60 are complementary to the inner surfaces 46, 48 of the cutout 44. The other two longitudinally extending surfaces of the insert 60 are perpendicular to each other and include a confronting surface 68 and a perpendicular outer surface 70. The two seating surfaces 64, 66 meet at an inner longitudinally extending corner edge 72 diagonally opposite the cutting edge 62.

A plurality of fastener openings 74 extend through the insert 60 and its perpendicular outer surface 70 and inner seating surface 64. Fasteners 76 are receivable through the openings 74 and into corresponding openings 78 in the body 32 to removably secure the insert 60 in the cutout 44, as shown in FIGS. 3–5. When the insert 60 is secured in the cutout 44, the seating surfaces 64, 66 of the insert 60 abuttingly engage the inner surfaces 46, 48 of the cutout 44. As shown in FIG. 5, in the preferred embodiment, the inner corner edge 72 of the insert 60 substantially abuts the inner corner 50 of the cutout 44. The confronting surfaces 40, 68 of the body 32 and insert 60 together form the confronting surface of the assembled shear knife 30.

As can be seen in FIGS. 2, 3, and 5, in the preferred embodiment, both the inner corner 50 of the body 32 and the corner edge 72 of the insert 60 are radiused and are complementary in shape to provide substantially abutting engagement. FIG. 5A illustrates a modification of the preferred embodiment in which, when the insert 60 is secured in the cutout 44, there is clearance between the insert 60 and the body 32 at the inner corner 50. This clearance is provided in order to eliminate stress concentration at the meeting of corner edge 72 and inner corner 50. The clearance feature may be provided in combination with the radiusing of one or both of the inner corner 50 and the corner edge 72'.

The overall outer configuration of the assembled shear knife 30 of the invention is rectangular and is essentially the same as the outer configuration of a conventional one-piece shear knife. The cutting edge 62 is positioned in the same manner as a cutting edge of a conventional shear knife to provide shearing action when the power shear is operated. In other words, the cutting edge is positioned to confront a corresponding cutting edge on an opposite jaw. As described above, the angling of the second inner surface 48 tends to direct shearing forces from the cutting edge 62 diagonally inwardly toward the inner corner 50 and into the body 32 of the shear knife 30. This efficiently transfers shearing forces to the body 32 and reinforces seating engagement of the insert 60 in the cutout 44. It also reduces the size of the fasteners 76 required to hold the insert 60 in position.

The two parts 32, 60 of the shear knife 30 may be made from different materials. Each of the materials must be sufficiently hard to carry the forces generated by the shearing action of the jaws of the power shear in which the shear knife is installed. In addition, the insert 60 must be sufficiently wear resistant to provide a commercially reasonable useful life for the cutting edge 62. The capability of making the body 32 from a less wear resistant, less expensive material than the material from which the insert 60 is made provides a primary benefit of the shear knife of the invention, i.e. the reduced cost of the shear knife. A general example of suitable materials for the parts 32, 60 are two different types of steel. A more specific example is a body 32 of 4140 steel and an insert 60 of HARDOX 500 (trademark) steel. Another general example is an alloy steel body 32 and a carbide insert 60. Other suitable insert materials include ceramic and plastic. In each case, the greater wear resistance of the insert 60 in comparison to the body 32 is achieved by using a harder, and thus more wear resistant, insert material. The choice of insert material depends, at least in part, on the type of material to be cut.

Although the preferred embodiment of the invention has been illustrated and described herein, it is intended to be understood that various modifications and omissions in form and detail may be made without departing from the spirit and scope of the invention as defined by the following claims.

What is claimed is:

1. For use in a power shear of a type mountable on a piece of heavy equipment, such as a backhoe, and having a pair of opposite jaws at least one of which is mounted to pivot relative to the other, between an open position and a closed position, each jaw including a knife seat configured to receive a shear knife, to position the shear knives to have confronting surfaces and to cooperate with each other to shear material when the laws are moved toward their closed position, an improved shear knife comprising:

a main body configured to seat in a corresponding one of the knife seats and to be removably secured therein; said body being made of a first material that is sufficiently hard to carry forces generated by shearing action of the jaws, and said body having a corner cutout running along a longitudinal edge thereof; and said cutout being defined by first and second inner surfaces, said first inner surface intersecting and being at least substantially perpendicular to the confronting surface, and said second inner surface meeting said first inner surface at an inner corner of said cutout and forming an acute angle therewith to angle said second inner surface toward the confronting surface;

a blade insert having a single longitudinal cutting edge and being configured to be received into said cutout with surface portions of said insert abutting said first and second inner surfaces and with said cutting edge diagonally opposite said inner corner to confront a corresponding cutting edge on an opposite jaw, said insert being made from a second material more wear resistant than said first material and sufficiently hard to carry shearing forces; and a fastener engaging said insert and said body to removably secure said insert in said cutout;

wherein said body and said insert together form the confronting surface;

wherein, in use, the angling of said second inner surface tends to direct shearing forces from said cutting edge diagonally inwardly toward said inner corner and into said main body to efficiently transfer forces to said main body and reinforce seating engagement of said insert in said cutout; and wherein said inner corner is radiused.

2. The improved shear knife of claim 1, wherein, when said insert is secured in said cutout, there is clearance between said insert and said body at said inner corner.

3. For use in a power shear of a type mountable on a piece of heavy equipment, such as a backhoe, and having a pair of opposite jaws at least one of which is mounted to pivot relative to the other, between an open position and a closed position, each jaw including a knife seat configured to receive a shear knife, to position the shear knives to have confronting surfaces and to cooperate with each other to shear material when the jaws are moved toward their closed position, an improved shear knife comprising:

a main body configured to seat in a corresponding one of the knife seats and to be removably secured therein; said body being made of a first material that is sufficiently hard to carry forces generated by shearing action of the jaws, and said body having a corner cutout running along a longitudinal edge thereof; and said cutout being defined by first and second inner surfaces, said first inner surface intersecting and being at least substantially perpendicular to the confronting surface, and said second inner surface meeting said first inner surface at an inner corner of said cutout and forming an acute angle therewith to angle said second inner surface toward the confronting surface;

a blade insert having a single longitudinal cutting edge and being configured to be received into said cutout with surface portions of said insert abutting said first and second inner surfaces and with said cutting edge diagonally opposite said inner corner to confront a corresponding cutting edge on an opposite jaw, said insert being made from a second material more wear resistant than said first material and sufficiently hard to carry shearing forces; and a fastener engaging said insert and said body to removably secure said insert in said cutout;

wherein said body and said insert together form the confronting surface;

wherein, in use, the angling of said second inner surface tends to direct shearing forces from said cutting edge diagonally inwardly toward said inner corner and into said main body to efficiently transfer forces to said main body and reinforce seating engagement of said insert in said cutout; and wherein, when said insert is secured in said cutout, there is clearance between said insert and said body at said inner corner.

4. The improved shear knife of claim 1, wherein said acute angle is about 75°.

5. The improved shear knife of claim 3, wherein said acute angle is about 75°.

6. The improved shear knife of claim 1, wherein each of said first and second materials comprises steel.

7. The improved shear knife of claim 1, wherein said first material comprises steel, and said second material comprises carbide.

8. The improved shear knife of claim 1, wherein said first material comprises steel, and said second material comprises ceramic.

* * * * *